Patented July 8, 1924.

1,500,899

UNITED STATES PATENT OFFICE.

ARTHUR W. SCOLES, OF TULSA, OKLAHOMA.

COMPOSITION FOR REMOVING PAINT AND VARNISH.

No Drawing.   Application filed August 14, 1922.   Serial No. 581,780.

*To all whom it may concern:*

Be it known that I, ARTHUR W. SCOLES, a citizen of the United States, residing at Tulsa, in the county of Tulsa and State of Oklahoma, have invented certain new and useful Improvements in Compositions for Removing Paint and Varnish, of which the following is a specification.

The object of the present invention is to provide a novel composition for employment in removing paint, varnish, and the like from wooden and other surfaces and has as one of its objects to provide a composition for the purpose stated which will be quick and effective in its action and which will serve also to cleanse the surface.

Another object of the invention is to provide a composition for the purpose stated which may be freely employed without injuring the surface from which the paint or varnish is to be removed and which will not leave any deposit which would interfere with the application of a fresh coat of paint or varnish.

The composition consists of—

| | |
|---|---|
| Caustic soda | 80% |
| Ammonium carbonate | 8% |
| Corn starch | 12% |

These ingredients are thoroughly mixed in powdered form.

In using the composition, a suitable quantity thereof is mixed with water, and the solution is applied to or rubbed over the surface from which the paint or the like is to be removed. The corn starch in the composition will cause the solution when applied to form a somewhat slimy film upon the surface thus retaining the active ingredients of the composition in intimate contact with the surface and preventing the solution running off the surface too rapidly.

The composition is quick and effective in its action in softening and deteriorating the paint or varnish, and after it has been washed off from the surface, the surface will be left clean and free from any substances which would inhibit or interfere with the application of a fresh coat of paint or varnish.

Having thus described the invention, what is claimed as new is:

A composition for the purpose stated comprising a mixture of caustic soda 80%, ammonium carbonate 8%, and corn starch 12%.

In testimony whereof I affix my signature.

ARTHUR W. SCOLES. [L. S.]